US007912207B2

(12) United States Patent
McCormack et al.

(10) Patent No.: US 7,912,207 B2
(45) Date of Patent: Mar. 22, 2011

(54) DATA MESSAGING DURING TELEPHONY CALLS

(75) Inventors: Tony McCormack, Galway (IE); Paul D'Arcy, Galway (IE); Michael Hartman, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1194 days.

(21) Appl. No.: 11/313,371

(22) Filed: Dec. 21, 2005

(65) Prior Publication Data
US 2007/0140442 A1 Jun. 21, 2007

(51) Int. Cl.
H04M 5/00 (2006.01)

(52) U.S. Cl. ......... 379/265.09; 379/265.01; 379/265.02; 379/265.11; 379/266.01; 709/203; 709/206; 709/207; 709/218; 370/352; 370/282

(58) Field of Classification Search ............. 379/114.01, 379/265.09, 266.01; 709/203, 204, 206, 709/227, 228; 370/352, 208
See application file for complete search history.

(56) References Cited

U.S. PATENT DOCUMENTS

| 6,871,212 | B2* | 3/2005 | Khouri et al. ................ 709/204 |
|---|---|---|---|
| 2002/0138624 | A1* | 9/2002 | Esenther ...................... 709/227 |
| 2004/0260749 | A1* | 12/2004 | Trossen et al. ............... 709/200 |
| 2005/0074101 | A1* | 4/2005 | Moore et al. ............. 379/114.01 |
| 2005/0080628 | A1 | 4/2005 | Kuperstein |
| 2005/0180317 | A1* | 8/2005 | Shimada ...................... 370/217 |
| 2005/0213591 | A1* | 9/2005 | Nakazawa et al. ............ 370/401 |
| 2005/0220095 | A1* | 10/2005 | Narayanan et al. ............ 370/389 |
| 2005/0289097 | A1* | 12/2005 | Trossen et al. .................... 707/1 |
| 2006/0004924 | A1* | 1/2006 | Trossen .......................... 709/228 |
| 2006/0056419 | A1* | 3/2006 | Eichler et al. ............. 370/395.52 |
| 2006/0072523 | A1* | 4/2006 | Richardson et al. .......... 370/338 |
| 2006/0101098 | A1* | 5/2006 | Morgan et al. ................ 707/204 |
| 2007/0097879 | A1* | 5/2007 | Bleckert et al. ............... 370/254 |
| 2007/0133440 | A1* | 6/2007 | Bouat ........................... 370/282 |
| 2008/0208993 | A1* | 8/2008 | Skog ............................ 709/206 |
| 2008/0316998 | A1* | 12/2008 | Procopio et al. .............. 370/352 |

FOREIGN PATENT DOCUMENTS
GB 2405554 A 3/2005

OTHER PUBLICATIONS

RFC 3261, Rosenberg et al, Session Initiation Protocol, Jun. 2002, all pages.*
Manola et al.; "RDF Primer," Internet citation, Feb. 10, 2004, 95 pages.
Campbell, "Session Initiation Protocol Extension for Instant Messaging," Internet citation, Sep. 14, 2002, 20 pages.
Komericki, "Transparent Multi-Client Access and Dynamic Content Generation," Electrotechnical Conference, 2004, May 12, 2004, pp. 641-644.
Examination report of Apr. 30, 2009 in corresponding EP 06076836.3.

* cited by examiner

Primary Examiner — Curtis Kuntz
Assistant Examiner — Joseph J Nguyen
(74) Attorney, Agent, or Firm — Barnes & Thornburg LLP

(57) ABSTRACT

Calls made using the session initiation protocol (SIP) are augmented by exchanging data in the form of messages between terminals where the message content is defined by items of information expressed as uniform resource indicators (URIs). The receiving terminal can extract and process such information based on the semantic information in URI format.

8 Claims, 5 Drawing Sheets

DATA MESSAGING DURING TELEPHONY CALLS

TECHNICAL FIELD

This invention relates to data messaging during telephony calls.

BACKGROUND ART

Many telephony protocols for use with data networks provide, in addition to the voice channel, a dedicated data channel. It is often possible, during a voice call, to pass data from one endpoint to the other over such a dedicated data channel, and such data can be used for call control or for providing information to a call member. The data channels predominantly use proprietary data formats which means that two users, involved in, for example, a voice over Internet protocol (VoIP) call may be unable to share data in this way unless both are using the same client software. This is clearly disadvantageous given the increasing reliance on Internet telephony.

Organizations which are built around telephony interactions with users, such as contact centers employing agents to respond to customers and self-service contact centers, have generally sought to improve the automated aspects of their customer interface by providing more intelligent and intuitive voice-based services.

Indeed, the primary area of improvement of contact centers in recent years has been the development of automated speech recognition so that customers can traverse automated menus using voice commands rather than relying solely on the DTMF tones generated by key presses. However, voice-based services such as this are "one-dimensional" in the sense that the user can only listen to a particular segment and/or respond with a particular voice input at any given time. This can make the customer's experience very unrewarding, even with the best voice recognition.

For example, if a customer is seeking a quotation for marine insurance for a speedboat, a call placed to a general insurance company may give rise to a long search through the automated voice menus simply to discover whether or not marine insurance is provided. If asked to choose between "home insurance", "vehicle insurance", and "other insurance", the customer may first pick "other insurance" and navigate through the sub-menus seeking something that might cover marine insurance. If unsuccessful, the customer might be tempted to determine if "vehicle insurance" is considered by the company to include marine insurance, involving another trawl through the menu structure.

All this can take considerable time before the customer finally realizes that the company does not in fact offer marine insurance. A self-service system of this type remains unsatisfactory in comparison to a human agent (who could be directly asked the relevant question) unless and until the voice recognition software is accompanied by an agent which can understand voice inputs and provide intelligent responses to them (i.e. inputs such as "I am looking for marine insurance for my speedboat. Do you provide this type of underwriting?").

In contrast to such a self-service contact center application, the web page of the insurance company can sometimes be more useful and rewarding because the data format allows a multidimensional, richer view of the services provided by the company, from which the customer can quickly determine whether or not to pursue the enquiry seeking an insurance quotation from that company.

There is therefore an opportunity for providers of telephony-based automated applications to offer improved services which can alleviate some of the problems associated with traditional voice telephony and make their own offerings more attractive.

DISCLOSURE OF THE INVENTION

The invention provides a method of exchanging data between first and second telephony terminals during a telephony call, comprising the steps of:
- (a) initiating the call between the terminals using the session initiation protocol (SIP);
- (b) the first terminal generating information to be exchanged, wherein the information is generated in a format in which each item of information is defined in terms of resources referenced using uniform resource indicators (URIs); and
- (c) the information being transmitted from the first terminal to the second terminal as a message using SIP;
  whereby the second terminal may extract the information from the message and may automatically process the information based on information semantically available from the URIs.

The term "telephony terminal" as used herein is intended to denote both physical terminals and soft phones, i.e. software implementations providing telephony functionality. The term is also intended to embrace telephony applications and interfaces employed by automated services which interact with users using telephony sessions. An example of such a telephony terminal is the telephony interface used by an automated self-service application of a contact center or call center.

The references to certain steps being carried out by a terminal also include the same steps being carried out on behalf of the terminal by an associated piece of hardware or software operatively associated with the terminal.

Furthermore, references to "telephony" herein are intended to denote voice, video and multimedia telephony calls made over any network which is enabled for SIP calls and which is capable of transmitting messages of the type specified above.

The session initiation protocol (SIP) is concerned with setting up and tearing down sessions of various types including telephone calls. It does not prescribe the actual call signalling used to transport the call data and it does not provide a conventional data channel. Nevertheless there are options available to send messages of one sort or another using the SIP protocol. By using SIP messages to transport information which has been formulated in terms of resources which themselves are referenced using URIs, one can exchange information in a manner in which it can be "understood" and acted on by the receiving terminal.

The Resource Description Framework (RDF) standard of the World Wide Web Consortium (W3C) describes a way of formulating information semantically in this way, i.e. where each item of information is a statement comprising a subject, predicate and object. In its most direct form it can impart information about web resources themselves, but it also can be used to write machine-readable statements about pretty much any item or concept.

For example, if one wants to communicate that the creator of a particular webpage is John Doe, this can be formulated using a first identifier saying that:
  a resource (www.example.org/some_webpage.html—this is the subject of the statement)

has a property named "creator" (which is defined at another web location such as www.dublincore.org/documents/dcmi-terms—this is the predicate of the statement) whose value is defined at a location such as www.john-doe-homepage.com/aboutme—this is the object of the statement.

By building up suitable vocabularies, this basic method of describing pure web-based entities can be extended to say that the resource which has been defined as "insurance premium" has a property defined for "annual cost" whose value is the amount $1,000. By combining this with statements about the type of insurance in question (life/motor/home/marine) and the item being insured (the life of the individual identified as John Doe, or a boat defined using some approved vocabulary in the marine insurance industry), one can formulate complex and machine processable information about items not found part of the world wide web.

The SIP protocol is defined in detail at www.ietf.org/rfc/rfc3261. txt, while the RDF standard is described in detail at http://www.w3. org/TR/rdf-primer.

It will be appreciated that by generating information which is described in terms of resources referenced using uniform resource indicators (URIs), and by transmitting such information in the form of SIP messages, the usual difficulties with proprietary data formats can be overcome. This is despite the fact that SIP is itself silent on the transport mechanisms to be used for any messaging.

Furthermore, such messages provide the possibility that the receiving terminal can extract the information from the message, and because of the way in which the information has been described using URIs, can perform automated processing of or responses to the message, thereby enhancing the user experience.

Preferably, therefore, the method further comprises the steps, carried out by the second terminal, of:
 (d) extracting the information from the message; and
 (e) generating a response thereto, wherein the response is generated in a format in which each item of information is defined in terms of resources referenced using uniform resource indicators (URIs);
 (f) the response being transmitted from the second terminal to the first terminal as a message using SIP.

Further, preferably, the step of generating a response is conducted automatically by the second terminal based on processing the information in accordance with programmed rules.

Alternatively, the step of generating a response is conducted by the second terminal in accordance with an input to the second terminal following the presentation of some or all of the information to a user of the second terminal.

In a particularly preferred embodiment, the first telephony terminal is a telephony interface of an automated telephony application and the second telephony terminal is a telephony interface of a user in communication with the automated telephony application.

Further, preferably, the information to be exchanged describes a process of the automated telephony application.

More preferably, the description of a process of the automated telephony application comprises a model of a workflow or of a menu structure available to a user of the second telephony terminal.

Most preferably, the model of a workflow or of a menu structure includes an indication of the current position of the user within the model.

In a further preferred embodiment, the method includes the steps, carried out by the second terminal, of:

(d) providing a representation of the model to the user of the second terminal;
 (e) receiving from the user an input indicating an interaction with the model;
 (f) generating from the input an instruction to the first terminal, wherein the instruction is generated in a format in which the input is defined in terms of resources referenced using uniform resource indicators (URIs);
 (g) the instruction being transmitted from the second terminal to the first terminal as a message using SIP;
 whereby the user of the second terminal can interact with and control the telephony application according to the instruction.

The invention also provides a telephony terminal comprising:
 (a) a session initiation protocol (SIP) user agent for transmitting and receiving SIP messages to and from a network with which the terminal is in communication;
 (b) a processor programmed to generate information in a format in which each item of information is defined in terms of resources referenced using uniform resource indicators (URIs);
 (c) a message generator for receiving the information from the processor and for generating therefrom a message including the information, the message being suitable for transmission to a remote terminal via the network using SIP;
 whereby the remote terminal may extract the information from the message and may automatically process the information based on information semantically available from the URIs.

In another aspect of the invention there is provided a computer program product comprising instructions which when executed in a first telephony terminal during a telephony call to a second telephony terminal are effective to cause the first telephony terminal to:
 (a) participate in the initiation of the call between the terminals using the session initiation protocol (SIP);
 (b) generate information to be exchanged with the second telephony terminal, wherein the information is generated in a format in which each item of information is defined in terms of resources referenced using uniform resource indicators (URIs); and
 (c) transmit the information to the second terminal as a message using SIP;
whereby the second terminal may extract the information from the message and may automatically process the information based on information semantically available from said URIs.

BRIEF DESCRIPTION OF THE DRAWINGS

The invention will now be further illustrated by the following description of embodiments thereof, given by way of example only, with reference to the accompanying drawings in which.

DETAILED DESCRIPTION OF PREFERRED EMBODIMENTS

Figure 1:
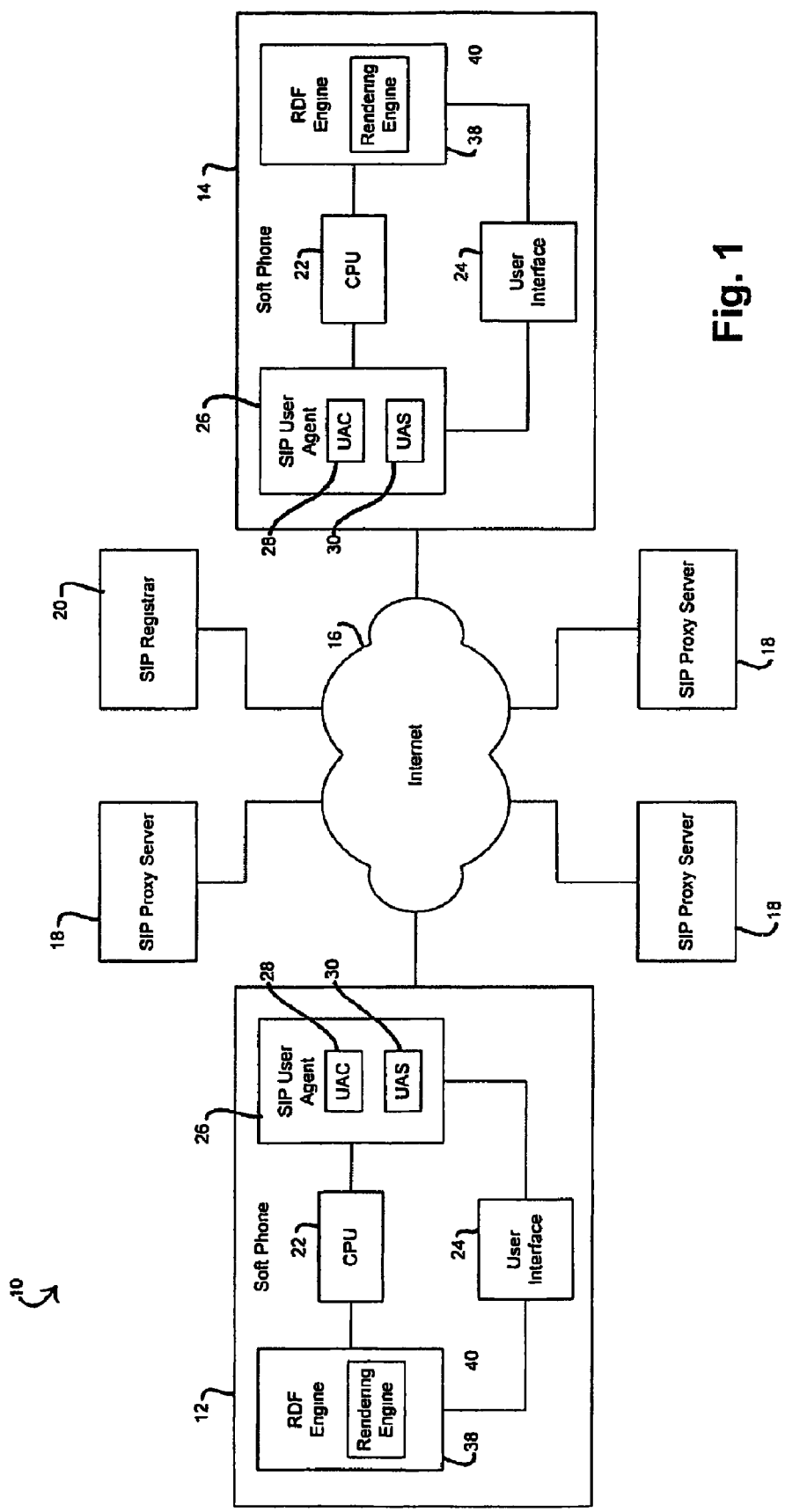
FIG. 1 is a diagram of a simple architecture implementing a method of the invention in communications between two users.

In FIG. 1 there is indicated, generally at 10, an architecture of a system according to the invention. A first soft phone client 12 and a second soft phone client 14 are connected to the Internet 16. Also connected to the Internet are a number of SIP proxy servers 18 and a SIP registrar 20.

Each soft phone 12, 14 includes a central processing unit or CPU 22 (which is generally the CPU of the computer on which the soft phone client, in the form of a piece of software, is running), and a user interface 24 for receiving inputs from the user and for providing visual, aural and other feedback to the user.

In addition, each soft phone client 12 is provided with a SIP user agent 26 which includes a user agent client (UAC) 28 and a user agent server (UAS) 30. Such SIP user agents 26 are well known and allow two entities to interact in a SIP scenario. The user agent client 28 generates requests and sends those to servers, whereas the user agent server 30 gets SIP requests, processes those requests and generates responses. In a peer-to-peer scenario, such as in FIG. 1, each user agent 26 is equipped to operate both as client and server depending on whether the requests are being initiated or responded to.

SIP servers such as the proxy servers 18 and the SIP registrar 20 possess a predefined set of rules to handle client requests. The proxy servers 18 receive requests from clients (since in the SIP environment those clients may have a SIP address for the recipient without necessarily knowing the exact location of the recipient), and they forward such requests to other proxy servers or to the recipient itself.

The SIP registrar 20 registers the locations of SIP users (these registrations are periodically refreshed), and it is this information which is ultimately used by the proxies to route requests from one end user to another. (Other types of server may also be included in a SIP environment, such as a redirect server or a location server, and the skilled person will be familiar with the functions and purpose of such servers which are not shown for simplicity.)

The operation of a SIP architecture such as that shown in simple form in FIG. 1 is described in detail in the Internet Engineering Task Force (IETF) request for comments document RFC3261, the contents of which are incorporated herein by reference.

It is pointed out, for the avoidance of any doubt, that while FIG. 1 illustrates two end users connecting to one another using soft phone software applications, the invention can equally be implemented with any suitable telephony terminal, such as a SIP-enabled handset.

Figure 2:
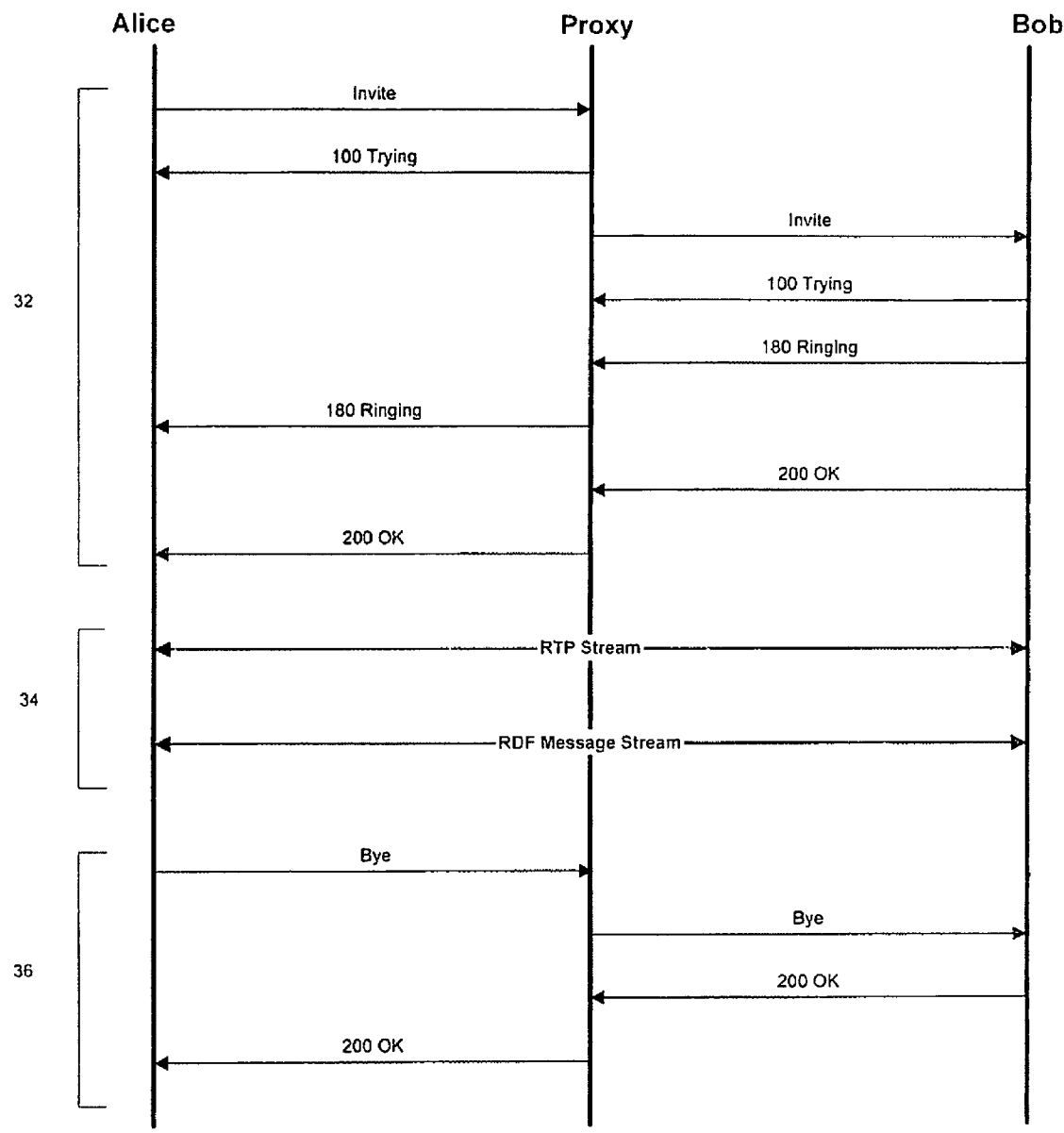
FIG. 2 is a message flow diagram illustrating a message flow between the users of FIG. 1.

FIG. 2 shows a simple call set up involving "Alice", a user of soft phone 12, and "Bob", a user of soft phone 14. The message flows are shown in conventional notation, with successive messages in time sequence being arranged from top to bottom. There are three phases to the session, namely the setup portion 32, the call body 34, and the termination 36. The call setup and termination portions 32, 36 are entirely conventional within the context of the SIP protocol.

Alice, who is seeking to set up a call with Bob, sends an INVITE to the proxy which responds with a trying message that it is TRYING to reach Bob (this message carries the ID No. 100, which conforms to the numbering specified for SIP messages but is of no other great significance). The proxy, which knows the location of Bob, sends an INVITE to Bob's user agent, which responds that it is TRYING to set up a connection. Bob's user agent causes Bob's soft phone application to ring, and this is notified with a message "180 RINGING". The proxy notifies Alice of this fact, also using a "180 RINGING" message.

When Bob chooses to take the call, his user agent sends a "200 OK" message to the proxy, which sends the same message back to Alice. At this point, the session has been initiated and Alice and Bob are in contact. An RTP stream can be set up directly from Alice to Bob as indicated in the call body portion 34. (The above description becomes more complicated if the proxy does not know where Bob is, in which case a number of intermediate proxies and/or redirect servers may be involved in setting up the session, but such complications are irrelevant to the scope of this invention and are handled comfortably by SIP clients and servers.)

Before describing what happens during the call body 34, the call termination will be briefly described. Alice (assuming it is she who decides to terminate the call) sends a message "BYE" to the proxy, which then sends the same message to Bob. When Bob acknowledges the termination of the call with a "200 OK" message, the proxy returns the same notification to Alice. (It may alternatively be the case that the routing between Alice and Bob is remembered, in which case the proxy can be omitted from the termination procedure).

The RTP stream in the call body 34 is simply the normal telephony (voice/video/multimedia) which occurs between two parties who have been placed into contact in a telephony session.

The RDF message stream referenced in the call body 34 refers to a one or more messages sent in either direction from one party to another which includes information encoded using the Resource Description Framework specification as approved by the World Wide Web Consortium. This is a generalized framework for representing information about resources in the Word Wide Web. While it is particularly intended for representing metadata about actual web resources, it can also be generalized to represent information about things that can be identified on the Web, even when they cannot be directly retrieved on the Web. Since it is possible to provide web-based information about almost any person or thing (whether real or abstract), the resource description framework provides an extremely powerful way of representing information using a non-proprietary language. A detailed description of RDF and its uses is provided at http://www.w3.org/TR/rdf-primer, as previously indicated.

Figures 3A, 3B:
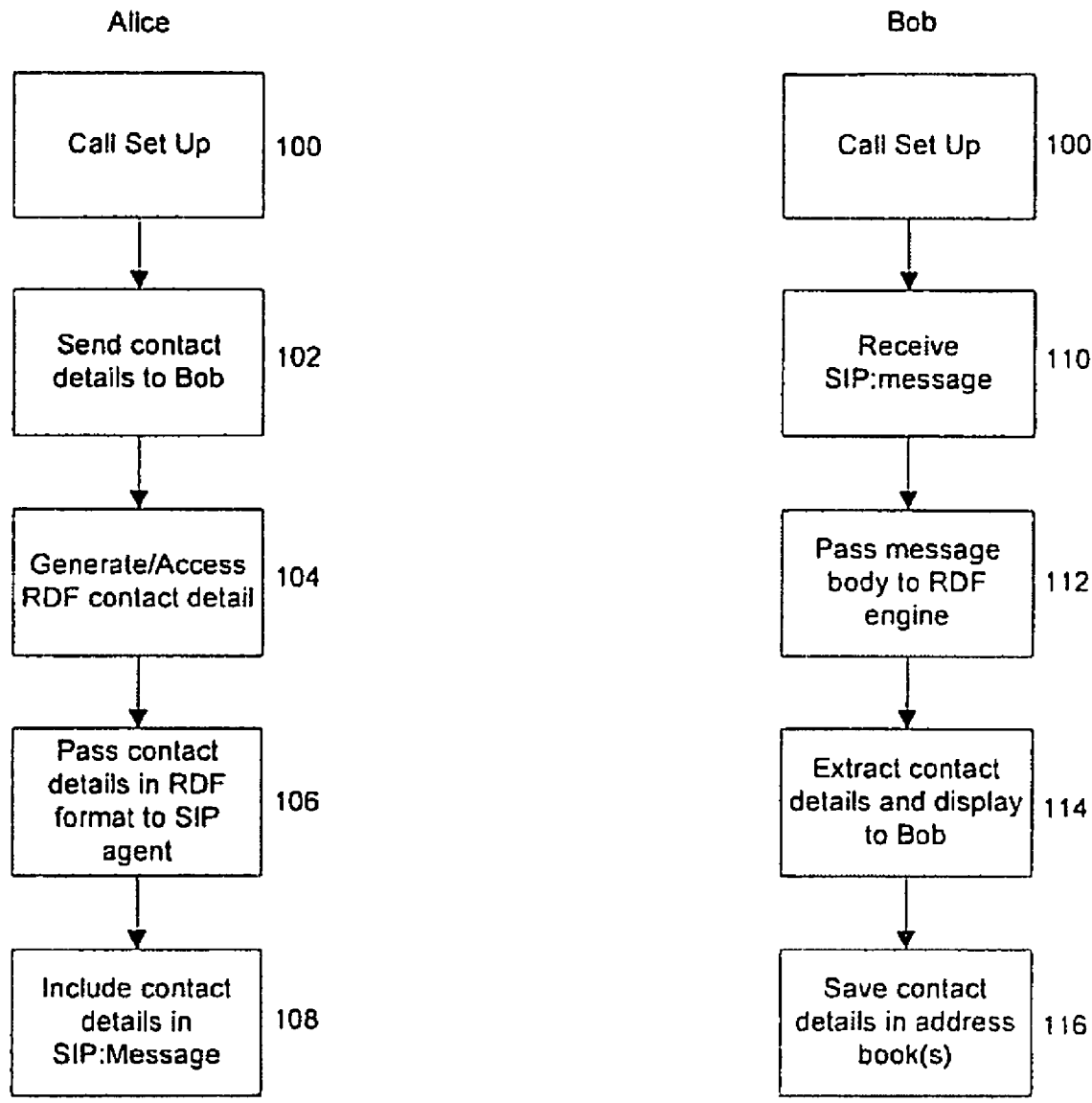
FIGS. 3A and 3B are flow charts of a session between two parties.

An illustrative example of the use of RDF messaging in the present invention is shown in FIGS. 3A and 3B. After the call setup illustrated in FIG. 2 (step 100 in FIGS. 3A and 3B), Alice may decide to send her contact details to Bob, step 102. This can be a conscious decision made by Alice, or it can be a saved preference of hers to always send contact details to everyone with whom she is in communication, or to each new person with whom she is in communication. Typically, the soft phone application will remember such preferences or the interface provided on the soft phone will provide a button allowing her to send such contact details.

Referring back to FIG. 1 briefly, it can be seen that each soft phone 12, 14 contains an RDF engine 38, which is a piece of software designed to convert information to the RDF format and to receive RDF information and process the information to extract its content. The RDF engine is typically be provided with built-in RDF vocabularies.

RDF vocabularies are the elements of language used to describe different kinds of resources and may be either generally agreed and in effect universal, or may be specialized descriptions of certain types of resources which are described in customized vocabularies referenced at a specific URI.

As an example of a generally accepted vocabulary, see www.dublincore.org which shows some very basic resource descriptions. Items such as contact details will be described in a generally accepted vocabulary, e.g. having elements such as lastname, firstname, email, street, city, zipcode, etc.

As an aside, an example of a specialized vocabulary which might be developed is a description of automated telephony applications (e.g. self-service or interactive voice response applications used by a call center). The elements of such a vocabulary could include descriptions of resources such as menu branches, nodes and leaves, or permitted actions which can be taken in relation to such menu elements, or of input fields (customer number) and input types (DTMF tone 4). The vocabulary can be as detailed as one might wish, and enables a full description to be given of an application and of interactions with the application.

Referring back to FIG. 3A, Alice's contact details are retrieved from her computer and passed to the RDF engine 38 which generates contact details in RDF format, step 104. If this is not the first time this process has occurred, then the RDF contact details may have been stored away and may be simply retrieved in step 104.

The RDF engine 38 passes the contact details in RDF format to the SIP user agent 26 (FIG. 1), step 106. The SIP UAC 28 packages this RDF contact in a message of the SIP:MESSAGE type. The SIP:MESSAGE method, which is described at www.ietf.org/rfc/rfc3428.txt, is intended to provide for instant messaging between SIP clients. The SIP: MESSAGE method does not concern itself with the setup of the SIP session but simply provides a way of one client sending a message, without requiring any acknowledgment, to another client when a SIP session is in progress.

While the SIP:MESSAGE method is intended for use between instant messaging clients, it is envisaged in the context of the current invention that this message format may also be used to send RDF messages which, on receipt by the SIP user agent at the other end, are identified as being RDF messages and the contents of which are passed to the local RDF engine 38 associated with the receiving SIP user agent.

The invention is not limited to use of the SIP: MESSAGE format, and other types of messages may be specified as extensions to SIP which may also by useful in allowing SIP user agents to pass messages in RDF format between one another.

In any event, in step 108, Alice's user agent 26 sends a SIP message to Bob's user agent, and this message is received in step 110 (FIG. 3B). Bob's SIP user agent passes the message body to the local RDF engine 38 (FIG. 1), step 112, which extracts the contact details from the RDF description and which uses a built-in rendering engine 40 to display the contact details to Bob, step 114. In an optional step, the contact details can be saved automatically in an address book or books on Bob's computer 116, or an option can be presented to Bob to decide whether to not to save some or all of the contact details.

The very simple message flow indicated in FIGS. 3A and 3B can be duplicated and augmented by introducing two-way messages, in which both parties exchange details, or by more complicated messaging streams in which one party issues a response to a message received from the other party. Because the messages received are in RDF format, they are designed to be machine comprehendible, providing almost limitless possibilities for the two soft phone clients to enter into dialogue or exchanges with one another by passing messages which are interpreted by the RDF engine at the other side and which give rise to actions at the other side (subject of course to any necessary security considerations being fulfilled to avoid malicious code being unwittingly executed).

Figure 4:
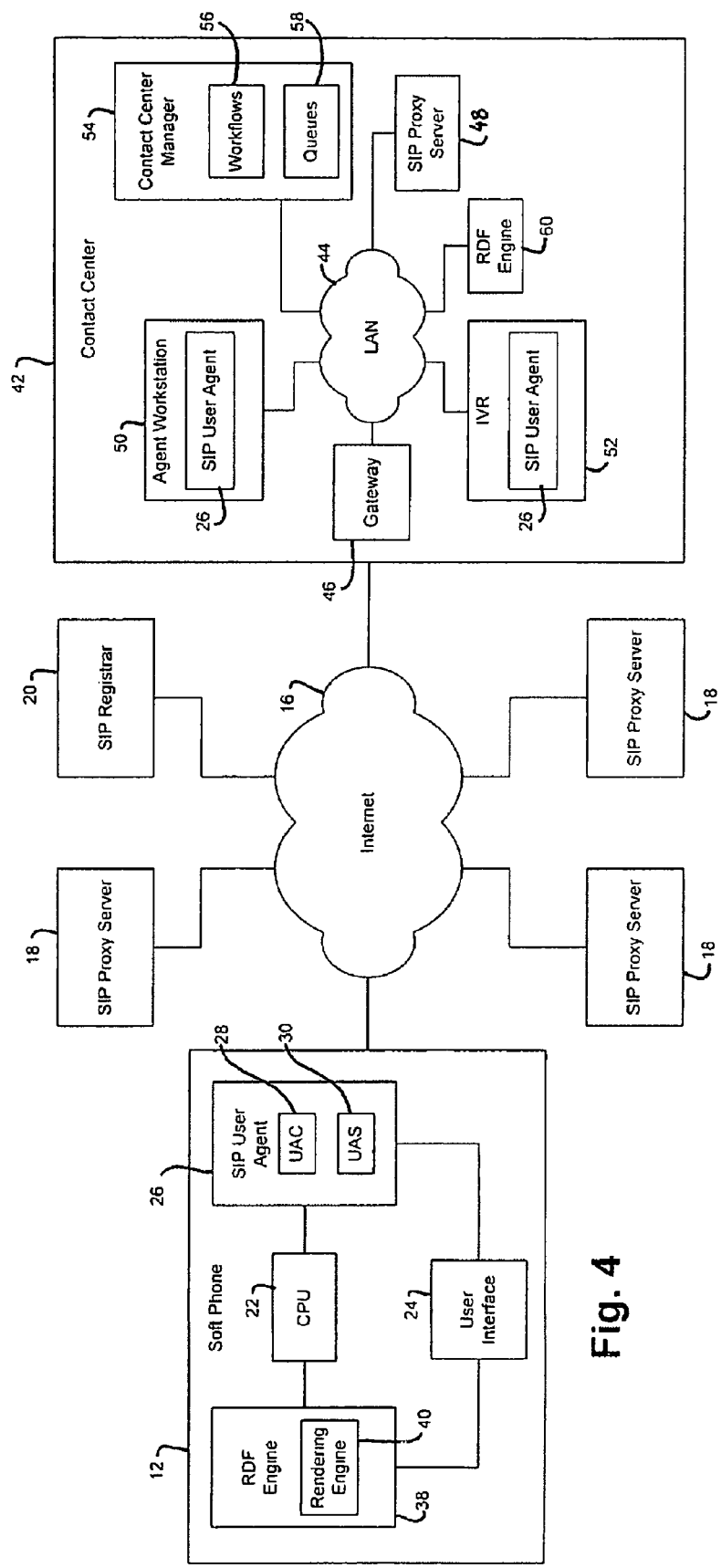
FIG. 4 is a diagram of a simple architecture for implementing a method of the invention between a user and a contact center.

As an illustration of a more powerful implementation of this method, reference is made to FIG. 4, which shows a user's soft phone 12 connected via the Internet 16 to a contact center 42. The soft phone 12 is identical to those shown in FIG. 1 (and the components of which are referenced using identical reference numerals). Similarly the Internet 16 is again equipped with SIP proxy servers 18 and a SIP registrar 20 as in FIG. 1).

The contact center 42 has a local area network 44 which is connected to the Internet 16 via a gateway 46. The contact center 42 has its own SIP proxy server 48 which is used in initiating and routing calls within the contact center, such as between the gateway 46, agent workstations 50 (one of which is shown in FIG. 4), and an interactive voice response (IVR) application 52. Both the agent workstation 50 and the IVR application 52 each have their own SIP user agent 26 enabling them to participate in SIP sessions.

Calls and other contacts arriving at the contact center or emanating from the contact center are managed in an overall sense by a contact center manager 54 which generates a virtual contact file for each such contact and routes it according to predetermined workflows 56 and within various queues 58 according to the needs of the customer in known manner.

The agent workstations 50 are not always part of every contact center. Self-service contact centers may rely solely on automated applications such as IVR application 52. Even in contact centers with agents, an application such as this is normally the first point to which new calls are routed in order to better direct the call and to queue the contact more efficiently.

The operation of such contact centers is well known to the person skilled in the art and a detailed description of the contact center is not central to the understanding of the present invention.

When a user is directed into IVR application 52, a series of recorded prompts, corresponding to points along a menu structure, are played to the user and the user is expected to respond using key presses or voice commands in order to navigate through the menu. In this way, information is passed from the user to the IVR application 52 (which in turn passes the collected information to the contact center manager 54).

The interaction of the user with the IVR application can, however, be augmented by the use of RDF information, and this process will now be described with additional reference to FIGS. 5A (which shows the process at the contact center 42) and 5B (which shows the process at the soft phone 12). Following call set up, step 120, the call is routed to the self service application as described above, step 122. These steps are mirrored on the soft phone side as steps 120*b* and 122*b*.

Figures 5A, 5B:
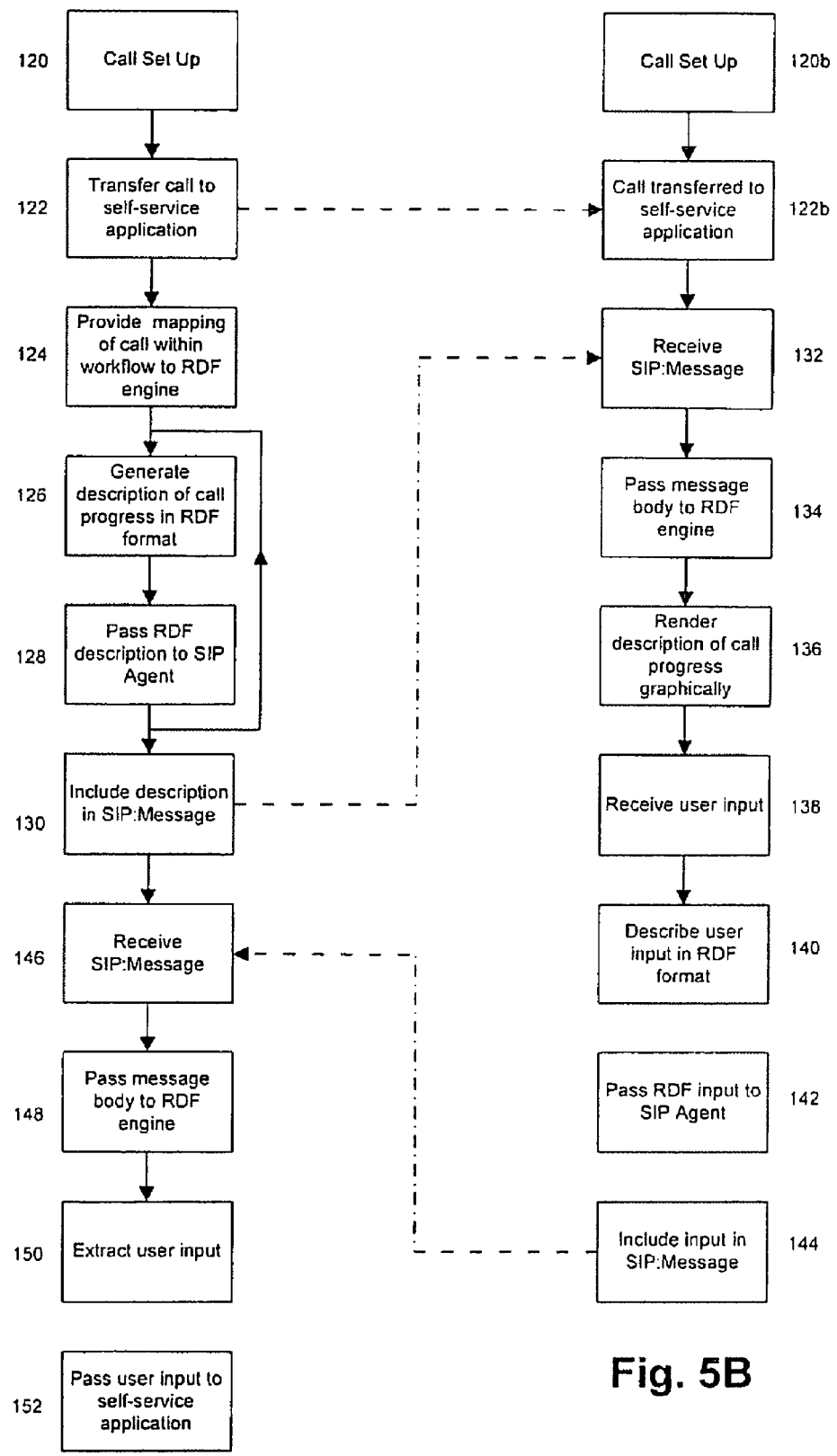
FIGS. 5A and 5B are flow charts describing the contact center and user actions, respectively, in a telephony session between the contact center and the user.

An RDF engine 60 (FIG. 4) is programmed to receive from the IVR application 52 a copy of its menu structure and, as the user navigates through the menu, to receive an indication of the current position of the user within the menu, step 124 (FIG. 5A).

This information can be converted by the RDF engine into an RDF format in which it is described in machine-understandable terms, step 126, and this RDF information is then passed to the SIP agent 26 of the IVR application 52, step 128. As indicated by the upwardly directed arrow, steps 126 and 128 are repeated periodically, so that the navigation of the user within the IVR menu structure is updated in RDF information passed to the SIP client.

The SIP agent can then send the information (i.e. the description or model of the process occurring within the IVR application) in the form of a SIP message as part of the call to the user's soft phone 12, step 130. The SIP message is received (FIG. 5B) at the soft phone in step 132, from where the soft phone SIP user agent 26 will pass the message content to the RDF engine 38, step 134.

The rendering engine 40 within the RDF engine 38 can provide a graphical rendition of the entire menu structure or the region in the vicinity of the user, step 136, allowing the user to interact with this graphical representation. Thus, a user wishing to jump to an entirely different branch of the menu structure may be provided with the option to do so (again such option and the permitted action for user at any one time can be described in the RDF description of the menu).

Any such user input is received in step 138 and is described, by the soft phone's RDF engine 38, in RDF terms (e.g. using the vocabulary defined for the permitted actions), step 140. This RDF-defined input is passed to the soft phone's SIP user agent 26, step 142, which includes it in a response SIP:MESSAGE, step 144. At this point the process reverts back to the contact center in FIG. 5A.

The contact center receives the SIP:MESSAGE containing the RDF description of the user input, step 146, and passes the body of this message (i.e. the RDF part) to the RDF engine 60 of the contact center 42, step 148. The RDF engine extracts and interprets the content of the message as a user input, step 150, and passes this user input to the IVR application, step 152.

The input can of course be of any allowable type (as defined by the system designers) and can control the IVR application in any permitted way (again subject to design and security constraints).

For example, a user who wished to jump laterally to an entirely different branch of a menu (such as a bank customer wishing to alter a direct debit instruction after having made a balance enquiry) might be permitted to do so by clicking on the relevant node of the bank's IVR application.

In another example, a user prompted for his or her first and last names might simply opt to have this information submitted via RDF information in a SIP message rather than speaking the names or spelling the names.

The invention is not limited to the embodiments described herein which can be modified or varied without departing from the scope of the claimed invention.

We claim:

1. A method of exchanging data between first and second telephony terminals during a telephony call, comprising the steps of:
    (a) initiating said call between said terminals using the Session Initiation Protocol (SIP);
    (b) said first terminal generating information to be exchanged, wherein said information is generated in a format in which each item of information is defined as resources, referenced using uniform resource indicators (URIs); and
    (c) said information being transmitted from said first terminal to said second terminal as a message using SIP;
wherein said first telephony terminal is a telephony interface of an automated telephony application and said second telephony terminal is a telephony interface of a user in communication with said automated telephony application;
wherein said information to be exchanged describes a process of said automated telephony application comprising a model of a workflow or of a menu structure available to a user of said second telephony terminal during said call and the method further comprising the steps of:
    (d) providing a representation of said model to said user of said second terminal;
    (e) receiving from said user an input indicating an interaction with said model;
    (f) generating from said input an instruction to said first terminal, wherein said instruction is generated in a format in which said input is defined as resources referenced using uniform resource indicators (URIs); and
    (g) transmitting said instruction from said second terminal to said first terminal as a message using SIP;
whereby said user of said second terminal can interact with and control said telephony application according to said instruction.

2. A method of exchanging data as claimed in claim 1, further comprising the steps, carried out by said second terminal, of:
    (a) extracting said information from said message; and
    (b) generating a response thereto, wherein said response is generated in a format in which each item of information is defined as resources referenced using uniform resource indicators (URIs);
said response being transmitted from said second terminal to said first terminal as a message using SIP.

3. A method of exchanging data as claimed in claim 2, wherein said step of generating a response is conducted automatically by said second terminal based on processing said information in accordance with programmed rules.

4. A method of exchanging data as claimed in claim 2, wherein said step of generating a response is conducted by said second terminal in accordance with an input to said second terminal following said presentation of some or all of said information to a user of said second terminal.

5. A method of exchanging data as claimed in claim 1, wherein said model of a workflow or of a menu structure includes an indication of said current position of said user within said model.

6. A telephony terminal comprising:
    (a) a session initiation protocol (SIP) user agent for transmitting and receiving SIP messages to and from a network with which said terminal is in communication;
    (b) a processor programmed to generate information in a format in which each item of information is defined as resources, referenced using uniform resource indicators (URIs;
    (c) a message generator for receiving said information from said processor and for generating therefrom a message including said information, said message being suitable for transmission to a remote terminal via said network using SIP;
wherein said telephony terminal is a telephony interface of an automated telephony application and said remote terminal is a telephony interface of a user in communication with said automated telephony application;
wherein said information to be exchanged describes a process of said automated telephony application comprising a model of a workflow or of a menu structure available to a user of said remote telephony terminal during said call and wherein said remote terminal is arranged to:
    (d) provide a representation of said model to said user of said remote terminal:
    (e) receive from said user an input indicating an interaction with said model:
    (f) generate from said input an instruction to said telephony terminal, wherein said instruction is generated in a format in which said input is defined as resources referenced using uniform resource indicators (URIs); and
    (g) transmit said instruction from said remote terminal to said telephony terminal as a message using SIP;

whereby said user of said remote terminal can interact with and control said telephony application according to said instruction.

7. A computer program product comprising a non-transitory computer readable medium encoded with computer executed instructions, which when executed in a first telephony terminal during a telephony call to a second telephony terminal, are effective to cause said first telephony terminal to:
- (a) participate in said initiation of said call between said terminals using said session initiation protocol (SIP);
- (b) generate information to be exchanged with said second telephony terminal, wherein said information is generated in a format in which each item of information is defined in terms of resources, referenced using uniform resource indicators (URIs); and
- (c) transmit said information to said second terminal as a message using SIP;

wherein said first telephony terminal is a telephony interface of an automated telephony application and said second telephony terminal is a telephony interface of a user in communication with said automated telephony application;

wherein said information to be exchanged describes a process of said automated telephony application comprising a model of a workflow or of a menu structure available to a user of said second telephony terminal during said call; and wherein said non-transitory computer readable medium is further encoded with computer executed instructions which when executed in said second telephony terminal are effective to cause said second telephony terminal to:
- (d) provide a representation of said model to said user of said second terminal;
- (e) receive from said user an input indicating an interaction with said model;
- (f) generate from said input an instruction to said first terminal, wherein said instruction is generated in a format in which said input is defined as resources referenced using uniform resource indicators (URIs); and
- (g) transmit said instruction from said second terminal to said first terminal as a message using SIP;

whereby said user of said second terminal can interact with and control said telephony application according to said instruction.

8. A method of exchanging data as claimed in claim 1, wherein said information is generated in the format of the Resource Description Framework.

\* \* \* \* \*